US011079012B2

(12) United States Patent
Takahashi et al.

(10) Patent No.: US 11,079,012 B2
(45) Date of Patent: Aug. 3, 2021

(54) ROTARY ACTUATOR

(71) Applicant: DENSO CORPORATION, Kariya (JP)

(72) Inventors: Yuuya Takahashi, Kariya (JP); Hiroyuki Kado, Kariya (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 16/918,114

(22) Filed: Jul. 1, 2020

(65) Prior Publication Data

US 2021/0003213 A1  Jan. 7, 2021

(30) Foreign Application Priority Data

Jul. 2, 2019  (JP) .............................. JP2019-123854

(51) Int. Cl.
| | |
|---|---|
| *F16H 61/32* | (2006.01) |
| *F16H 19/00* | (2006.01) |
| *F16H 61/28* | (2006.01) |
| *F16H 61/00* | (2006.01) |

(52) U.S. Cl.
CPC ........... *F16H 61/32* (2013.01); *F16H 19/001* (2013.01); *F16H 61/0006* (2013.01); *F16H 2061/2853* (2013.01); *F16H 2061/326* (2013.01)

(58) Field of Classification Search
CPC .... F16H 61/32; F16H 19/001; F16H 61/0006; F16H 2061/2853; F16H 2061/326
See application file for complete search history.

(56) References Cited

U.S. PATENT DOCUMENTS

| | | | | |
|---|---|---|---|---|
| 9,726,281 | B2 * | 8/2017 | Kurita | F16H 57/0486 |
| 9,970,538 | B2 * | 5/2018 | Chen | F16H 59/08 |
| 9,970,539 | B2 * | 5/2018 | Sakaguchi | F16H 61/32 |
| 10,234,030 | B2 * | 3/2019 | Nakayama | H02K 1/146 |
| 10,288,171 | B2 * | 5/2019 | Yamamoto | G05D 3/20 |
| 10,563,760 | B2 * | 2/2020 | Takahashi | F16H 1/32 |
| 10,844,952 | B2 * | 11/2020 | Sakaguchi | B60W 30/19 |
| 10,844,954 | B2 * | 11/2020 | Kamio | B60W 10/08 |
| 10,955,051 | B2 * | 3/2021 | Jeon | F16H 59/68 |
| 2015/0285373 | A1 | 10/2015 | Nagahori et al. | |
| 2016/0102761 | A1 | 4/2016 | Kuwahara et al. | |
| 2019/0229588 | A1 | 7/2019 | Takahashi et al. | |

FOREIGN PATENT DOCUMENTS

JP   2018-080707   5/2018

* cited by examiner

*Primary Examiner* — David M Fenstermacher
(74) *Attorney, Agent, or Firm* — Nixon & Vanderhye P.C.

(57) ABSTRACT

An output axle includes: an axle hole, through which a manual shaft is inserted; an axle pipe portion, at which the axle hole is formed, and an output axle tubular portion, which is located on a side of the axle pipe portion that is opposite to a shift range change device. A magnet holder includes: a holder main body, at which a holder hole to be fitted with the manual shaft is formed; and a seal portion, which is formed integrally with the holder main body in one-piece, while the seal portion is configured to contact an inner peripheral wall of the output axle tubular portion and seal between the magnet holder and the output axle tubular portion.

10 Claims, 5 Drawing Sheets

ROTARY ACTUATOR

CROSS REFERENCE TO RELATED APPLICATION

This application is based on and incorporates herein by reference Japanese Patent Application No. 2019-123854 filed on Jul. 2, 2019.

TECHNICAL FIELD

The present disclosure relates to a rotary actuator.

BACKGROUND

There has been proposed a shift-by-wire system that controls an operation of a rotary actuator based on a shift range selected by a driver of a vehicle and changes a shift range of an automatic transmission through a shift range change device.

For example, in one such a shift-by-wire system, a rotary actuator includes an output axle that outputs a torque to a manual shaft of a shift range change device. Furthermore, this rotary actuator includes a magnet holder that is formed separately from the output axle and is rotated through rotation of the manual shaft.

SUMMARY

This section provides a general summary of the disclosure, and is not a comprehensive disclosure of its full scope or all of its features.

According to the present disclosure, there is provided a rotary actuator configured to rotate a shaft of a subject device. The rotary actuator includes a housing, an electric motor, an output axle, a magnet holder, a magnet and an angle sensor. The electric motor is received in the housing. The output axle has an axle hole, through which the shaft is inserted. The output axle is configured to be rotated by a torque outputted from the electric motor and output the torque to the shaft. The magnet holder has a holder hole, into which the shaft is fitted. The magnet is placed at the magnet holder and is configured to generate a magnetic flux. The angle sensor is configured to sense the magnetic flux generated from the magnet. The magnet holder includes: a holder main body, at which the holder hole is formed; and a seal portion, which is formed integrally with the holder main body in one-piece. The seal portion is configured to contact one of an inner peripheral wall and an outer peripheral wall of an output axle tubular portion of the output axle.

BRIEF DESCRIPTION OF THE DRAWINGS

The drawings described herein are for illustrative purposes only of selected embodiments and not all possible implementations, and are not intended to limit the scope of the present disclosure.

DETAILED DESCRIPTION

Figure 1:
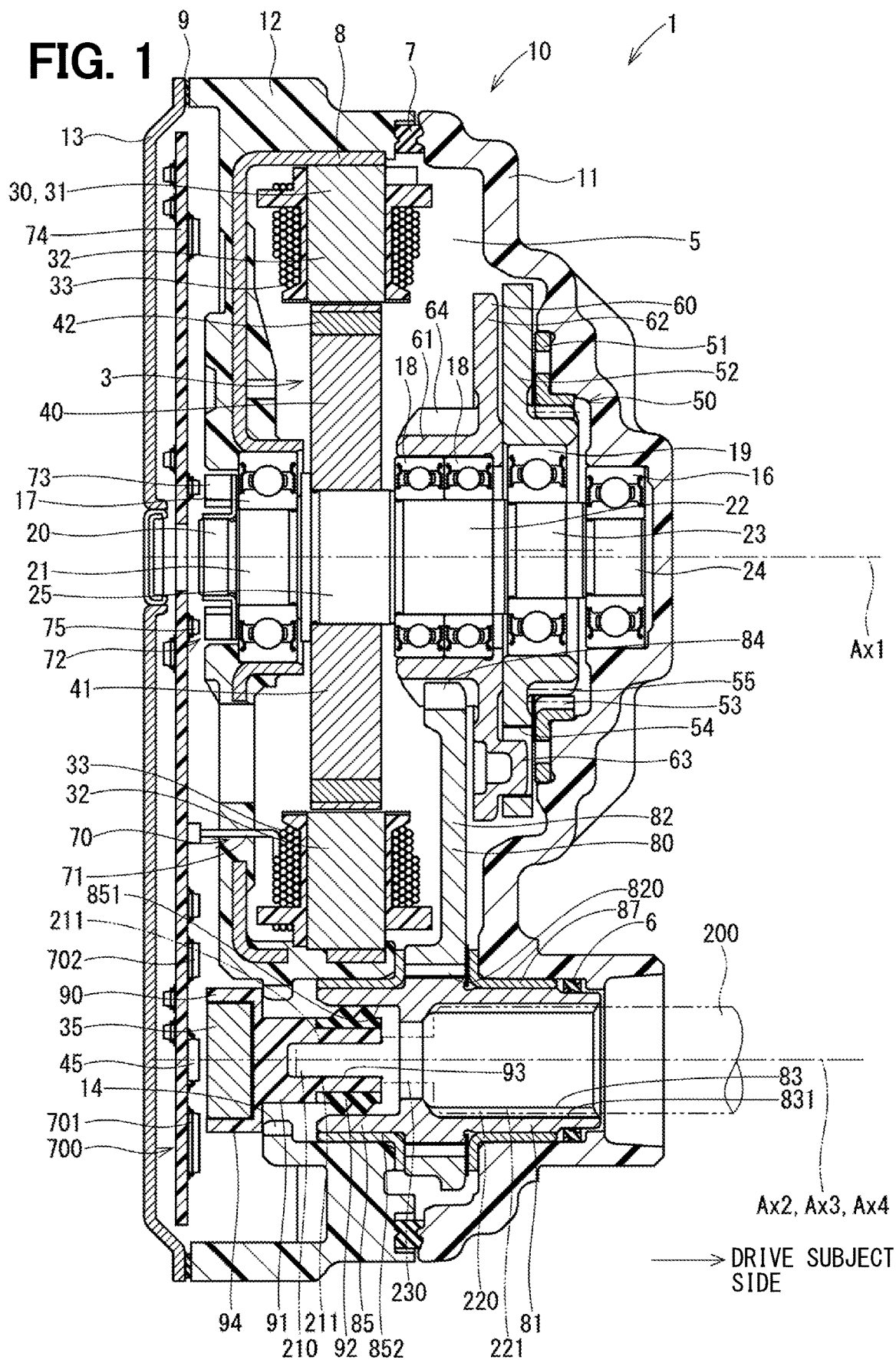
FIG. 1 is a cross-sectional view of a rotary actuator according to a first embodiment.

There has been proposed a shift-by-wire system that controls an operation of a rotary actuator based on a shift range selected by a driver of a vehicle and changes a shift range of an automatic transmission through a shift range change device.

For example, in one such a shift-by-wire system, a rotary actuator includes an output axle that outputs a torque to a manual shaft of a shift range change device. Furthermore, this rotary actuator includes a magnet holder that is formed separately from the output axle and is rotated through rotation of the manual shaft. A magnetic flux, which is generated from a magnet installed at the magnet holder, is sensed with an angle sensor to sense a rotational angle of the magnet holder, and a rotational angle of the manual shaft is sensed based on the rotational angle of the magnet holder.

In the rotary actuator described above, an end portion of the output axle, which is located on the magnet holder side, is shaped in a tubular form. Furthermore, an end portion of the magnet holder, which is located on the output axle side, is shaped in a tubular form and is placed on a radially outer side of the tubular end portion of the output axle. A seal member, which is shaped in a ring form, is placed between the tubular end portion of the magnet holder and the tubular end portion of the output axle to seal between the magnet holder and the output axle.

In the rotary actuator described above, the seal member is formed separately from the magnet holder and the output axle. Therefore, the number of components and the number of assembling steps may possibly be increased, and the assemblability may possibly be deteriorated.

According to the present disclosure, there is provided a rotary actuator configured to rotate a shaft of a subject device, i.e., a drive subject. The rotary actuator includes a housing, an electric motor, an output axle, a magnet holder, a magnet and an angle sensor.

The electric motor is received in the housing. The output axle has an axle hole, through which the shaft is inserted while the shaft is fitted to the axle hole. The output axle is configured to be rotated by a torque outputted from the electric motor and output the torque to the shaft. The magnet holder has a holder hole, into which the shaft is fitted. The magnet holder is configured to be rotated integrally with the shaft. The magnet is placed at the magnet holder and is configured to generate a magnetic flux. The angle sensor is configured to sense the magnetic flux generated from the magnet and output a signal, which corresponds to a rotational angle of the magnet holder.

The output axle includes: an axle pipe portion, at which the axle hole is formed; and an output axle tubular portion, which is located on a side of the axle pipe portion that is opposite to the subject device. The magnet holder includes: a holder main body, at which the holder hole is formed; and a seal portion, which is formed integrally with the holder main body in one-piece. The seal portion is configured to contact one of an inner peripheral wall and an outer peripheral wall of the output axle tubular portion and seal between the magnet holder and the output axle tubular portion.

In the present disclosure, the seal portion, which is configured to seal between the magnet holder and the output axle tubular portion, is formed integrally with the holder main body in one piece. Therefore, the number of the components and the number of the assembling steps can be reduced.

Hereinafter, a rotary actuator of various embodiments will be described with reference to the drawings. In the following embodiments, components, which are substantially identical to each other, will be indicated by the same reference signs and will not be redundantly described for the sake of simplicity. In addition, in the following embodiments, substantially the same components implement the same or similar effects and advantages.

First Embodiment

A rotary actuator 1 shown in FIG. 1 is applied as a drive device of, for example, a shift-by-wire system that changes a shift of an automatic transmission of a vehicle.

Figure 2:
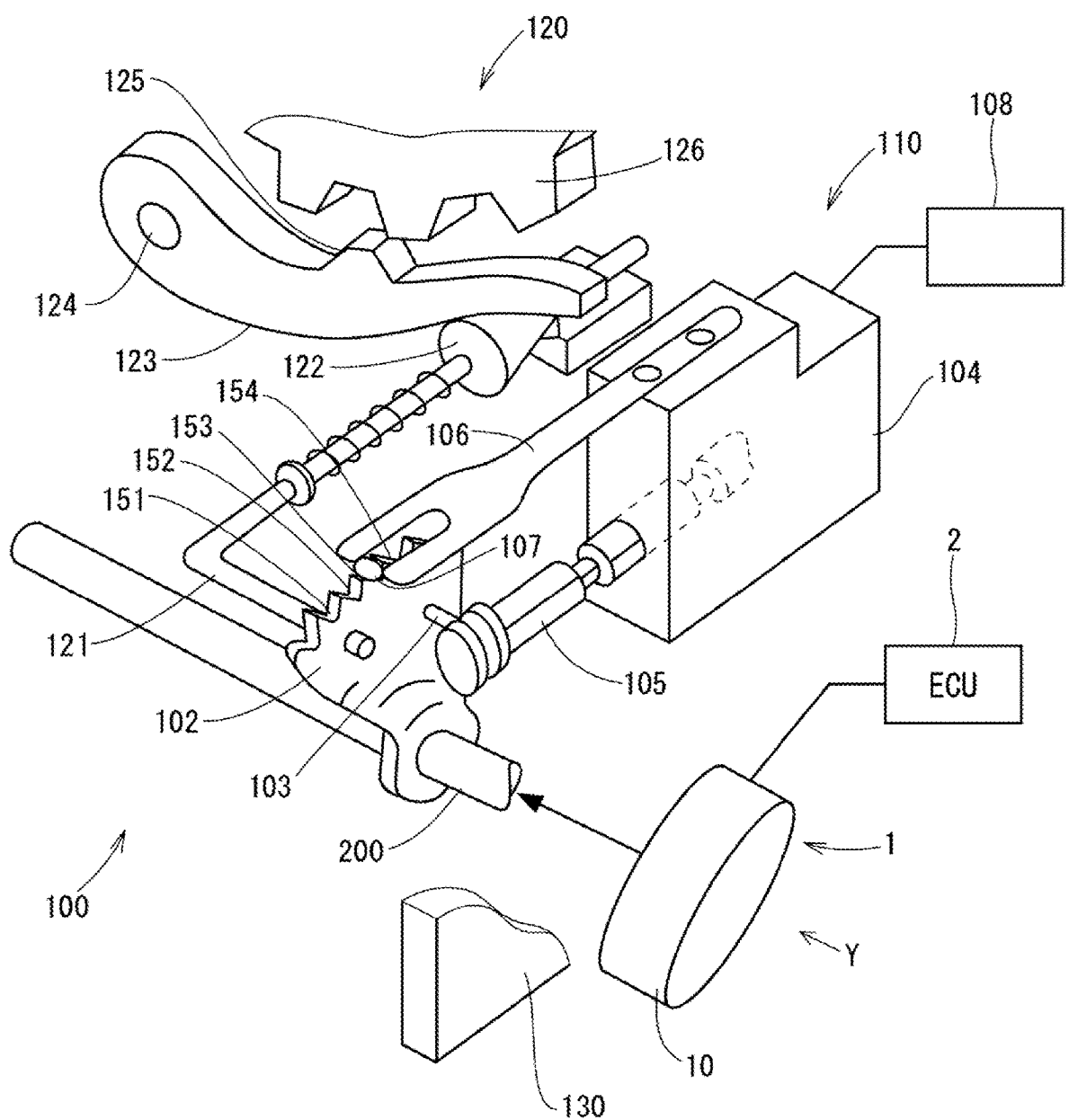
FIG. 2 is a schematic diagram of a shift-by-wire system, at which the rotary actuator of the first embodiment is applied.

First of all, the shift-by-wire system will be described. As shown in FIG. 2, the shift-by-wire system 100 includes the rotary actuator 1, an electronic control unit (ECU) 2, a shift range change device 110 and a parking change device 120. The rotary actuator 1 rotates a manual shaft 200 of the shift range change device 110 that serves as a subject device, i.e., a drive subject. Thereby, a shift range of the automatic transmission 108 is changed. The rotation of the rotary actuator 1 is controlled by the ECU 2 (serving as an external control device or controller). The rotary actuator 1 is installed to, for example, a wall portion 130 of the shift range change device 110. The wall portion 130 serves as an installation subject, to which the rotary actuator 1 is installed. The rotary actuator 1 drives a park rod 121 of the parking change device 120 by rotating the manual shaft 200 of the shift range change device 110. The manual shaft 200 serves as a shaft.

The shift range change device 110 includes the manual shaft 200, a detent plate 102, an oil pressure valve body 104 and the wall portion 130. The wall portion 130 receives the manual shaft 200, the detent plate 102 and the oil pressure valve body 104. The manual shaft 200 is arranged such that one end portion of the manual shaft 200 projects from the wall portion 130 through a hole (not shown), which is formed through the wall portion 130.

The one end portion of the manual shaft 200 is coupled to an output axle 80 of the rotary actuator 1, as described in detail later. The detent plate 102 is shaped into a fan-shape form and radially outwardly extends from the manual shaft 200. The detent plate 102 is rotated integrally with the manual shaft 200. A pin 103, which projects in parallel with the manual shaft 200, is formed at the detent plate 102.

The pin 103 is engaged to an end portion of a manual spool valve 105 that is installed in the oil pressure valve body 104. Thereby, the manual spool valve 105 is reciprocated in an axial direction of the manual spool valve 105 by the detent plate 102, which is rotated integrally with the manual shaft 200. When the manual spool valve 105 is reciprocated in the axial direction, the manual spool valve 105 switches an oil pressure supply passage that supplies an oil pressure to an oil pressure clutch of the automatic transmission 108. Thus, an engaging state of the oil pressure clutch is changed, and the shift range of the automatic transmission 108 is changed.

The detent plate 102 has a recess 151, a recess 152, a recess 153 and a recess 154 at a radial end portion of the detent plate 102. These recesses 151-154 correspond to, for example, a P-range, an R-range, an N-range and a D-range, respectively, which are the shift ranges of the automatic transmission 108. A stopper 107, which is supported at a distal end of a leaf spring 106, is fitted into one of the recesses 151-154 of the detent plate 102, so that an axial position of the manual spool valve 105 is set. At this time, a rotational position of the manual shaft 200 is held at a predetermined position. Here, the detent plate 102, the leaf spring 106 and the stopper 107 form a holding mechanism that holds the rotational position of the manual shaft 200 at the predetermined position to position of the manual shaft 200.

When a torque is applied from the rotary actuator 1 to the detent plate 102 through the manual shaft 200, the stopper 107 is moved to another one of the recesses 151-154, which is adjacent to the above-described one of the recesses 151-154. Thereby, the axial position of the manual spool valve 105 is changed.

For example, when the manual shaft 200 is rotated in a clockwise direction in a view taken in a direction of an arrow Y in FIG. 2, the pin 103 is rotated through the detent plate 102 to push the manual spool valve 105 into an inside of the oil pressure valve body 104, so that a corresponding oil passage is sequentially changed in an order of an oil passage for the D-range, an oil passage for the N-range, an oil passage for the R-range and an oil passage for the P-range. In this way, the shift range of the automatic transmission 108 is changed in the order of the D-range, the N-range, the R-range and the P-range.

In contrast, when the manual shaft 200 is rotated in a counterclockwise direction, the pin 103 is rotated to pull the manual spool valve 105 from the inside of the oil pressure valve body 104, so that the corresponding oil passage is sequentially changed in an order of the oil passage for the P-range, the oil passage for the R-range, the oil passage for the N-range and the oil passage for the D-range. Thereby, the shift range of the automatic transmission 108 is changed in the order of the P-range, the R-range, the N-range and the D-range.

As discussed above, predetermined rotational angles of the manual shaft 200, which is rotated by the rotary actuator 1, i.e., predetermined positions of the manual shaft 200 in the rotational direction correspond to the shift ranges, respectively, of the automatic transmission 108.

The parking change device 120 includes the park rod 121, a park pole 123 and a parking gear 126. The park rod 121 is shaped generally into an L-shape form. The detent plate 102 is connected to one end portion of the park rod 121. A conical portion 122 is formed at another end portion of the park rod 121. When the rotational motion of the detent plate 102 is converted into linear motion of the park rod 121, the conical portion 122 is reciprocated in an axial direction of the conical portion 122. The park pole 123 contacts an outer peripheral surface of the conical portion 122. Therefore, when the park rod 121 is reciprocated, the park pole 123 is rotated about a shaft portion 124.

A projection 125 projects from the park pole 123 in a rotational direction of the park pole 123. When the projection 125 is engaged with the parking gear 126, rotation of the parking gear 126 is limited. Thereby, drive wheels of the vehicle are locked through a drive shaft or a differential gear, which are not depicted in the drawings. In contrast, when the projection 125 of the park pole 123 is disengaged from the parking gear 126, the rotation of the parking gear 126 is enabled. Thereby, the locking of the drive wheels of the vehicle is released.

Next, the rotary actuator 1 will be described.

As shown in FIG. 1, the rotary actuator 1 includes a housing 10, an input axle 20, an electric motor 3, a speed reducer (serving as a gear mechanism) 50, an output gear 60, an output axle 80, a magnet holder 90, a magnet 35 and an angle sensor 45.

The housing 10 includes a front housing 11, a rear housing 12 and a cover 13. The front housing 11 is made of, for example, resin. The rear housing 12 is made of, for example, resin. The cover 13 is made of, for example, metal and is shaped in a plate form.

Each of the front housing 11 and the rear housing 12 is shaped into a tubular form having a bottom. The front housing 11 and the rear housing 12 are fixed together with, for example, bolts in a state where an opening of the front housing 11 and an opening of the rear housing 12 contact with each other. Thereby, a space 5 is formed between the front housing 11 and the rear housing 12. The cover 13 is installed such that the cover 13 covers a side of the rear housing 12, which is opposite to the front housing 11.

In the present embodiment, the rotary actuator 1 is installed to the wall portion 130 such that a surface of the front housing 11, which is opposite to the rear housing 12, is opposed to the wall portion 130 of the shift range change device 110.

The input axle 20 is made of, for example, metal. The input axle 20 includes one end portion 21, a fixing portion 25, a large diameter portion 22, an eccentric portion 23 and the other end portion 24. The one end portion 21, the fixing portion 25, the large diameter portion 22, the eccentric portion 23 and the other end portion 24 are arranged in this order in an axial direction of an axis Ax1 of the input axle 20 and are formed integrally in one-piece.

The one end portion 21 is shaped in a cylindrical rod form. The fixing portion 25 is shaped in a cylindrical rod form and has an outer diameter that is larger than an outer diameter of the one end portion 21. The fixing portion 25 is coaxial with the one end portion 21, i.e., coaxial with the axis Ax1. The large diameter portion 22 is shaped in a cylindrical rod form and has an outer diameter that is smaller than the outer diameter of the fixing portion 25 and is larger than the outer diameter of the one end portion 21. The large diameter portion 22 is coaxial with the one end portion 21, i.e., coaxial with the axis Ax1. The eccentric portion 23 is shaped in a cylindrical rod form and has an outer diameter that is smaller than the outer diameter of the large diameter portion 22. The eccentric portion 23 is eccentric to the axis Ax1 that is the rotational center of the input axle 20. Specifically, the eccentric portion 23 is eccentric to the one end portion 21 and the large diameter portion 22. The other end portion 24 is shaped in a cylindrical rod form and has an outer diameter that is smaller than the outer diameter of the eccentric portion 23. The other end portion 24 is coaxial with the one end portion 21 and the large diameter portion 22, i.e., is coaxial with the axis Ax1.

The other end portion 24 of the input axle 20 is rotatably supported by a bearing 16, and the one end portion 21 of the input axle 20 is rotatably supported by a bearing 17. In the present embodiment, each of the bearing 16 and the bearing 17 is, for example, a ball bearing.

The bearing 16 is fitted to the front housing 11. Specifically, the other end portion 24 of the input axle 20 is rotatably supported by the front housing 11 through the bearing 16 installed to the front housing 11. Furthermore, the one end portion 21 of the input axle 20 is rotatably supported by the rear housing 12 through the bearing 17 that is installed to a hole of a plate 8, which is made of metal and is insert molded in the rear housing 12. As described above, the input axle 20 is rotatably supported by the housing 10.

The electric motor 3 is, for example, a three-phase brushless motor. The electric motor 3 is located at the rear housing 12 side of the space 5. Specifically, the electric motor 3 is received in the housing 10. The electric motor 3 includes a stator 30, coils 33 and a rotor 40.

The stator 30 is shaped generally in a circular ring form. The stator 30 is press fitted to the plate 8, which is made of the metal and is fixed to the rear housing 12, so that the stator 30 is non-rotatably fixed to the rear housing 12.

The stator 30 is made of a magnetic material, such as iron. The stator 30 includes a stator core 31 and a plurality of stator teeth 32. The stator core 31 is shaped in a circular ring form. The stator teeth 32 radially inwardly project from the stator core 31. The stator teeth 32 are arranged one after another at equal intervals in a circumferential direction of the stator core 31.

The coils 33 are wound around corresponding ones of the stator teeth 32. The coils 33 are electrically connected to a bus bar portion 70. The bus bar portion 70 is installed to a bottom portion of the rear housing 12, as shown in FIG. 1. An electric current to be supplied to the coils 33 is conducted through the bus bar portion 70.

A circuit board 74, a rotary encoder 72 and a control device 700 are provided in the present embodiment. The circuit board 74 is installed between the rear housing 12 and the cover 13. The circuit board 74 is fixed to the cover 13 such that a plane of the circuit board 74 is generally perpendicular to the axis Ax1.

The control device 700 is installed to the circuit board 74. The control device 700 includes a microcomputer 701 and switching devices 702. The microcomputer 701 and the switching devices 702 are installed to a surface of the circuit board 74 located on the rear housing 12 side.

The microcomputer 701 performs various calculations based on command signals from the ECU 2 and detection signals from the rotary encoder 72 and the angle sensor 45. Each of the switching devices 702 is, for example, a MOSFET. The switching devices 702 respectively perform a switching operation according to a drive signal from the microcomputer 701 to switch energization to the coils 33.

The bus bar portion 70 include terminals 71 connected to the coils 33. The coils 33 are electrically connected to the terminals 71. The electric power is supplied to the terminals 71 based on a drive signal outputted from the microcomputer 701.

The rotor 40 is placed on a radially inner side of the stator 30. The rotor 40 includes a rotor core 41 and a plurality of magnets 42. The rotor core 41 is formed by stacking a plurality of thin plates in a plate thickness direction while the thin plates are made of a magnetic material, such as iron. The rotor core 41 is shaped in a circular ring form and is securely press fitted to the fixing portion 25 of the input axle 20. The magnets 42 are arranged at equal intervals in a circumferential direction along an outer periphery of the rotor core 41. The magnets 42 are magnetized such that N-poles and S-poles are alternately arranged in the circumferential direction. The rotor core 41 of the rotor 40 is securely press fitted to the input axle 20 of the rotor core 41, so that the rotor 40 is rotatable together with the input axle 20 relative to the housing 10 and the stator 30.

When the electric power is supplied to the coils 33, a magnetic force is generated at the stator teeth 32, around which the coils 33 are wound. Thereby, the magnetic poles of the corresponding magnets 42 of the rotor 40 are magnetically attracted to the corresponding stator teeth 32. The coils 33 form three phases, i.e., a U-phase, a V-phase and a W-phase (i.e., the coils 33 include a U-phase coil, a V-phase coil and a W-phase coil). When the microcomputer 701 sequentially changes the energization of the coils 33 in an order of the U-phase, the V-phase and the W-phase, the rotor 40 is rotated in one rotational direction. In contrast, when the microcomputer 701 changes the energization of the coils 33 in an order of the W-phase, the V-phase and the U-phase, the rotor 40 is rotated in the other rotational direction, which is opposite to the one rotational direction. When the magnetic force, which is generated at the stator teeth 32, is controlled by sequentially changing the energization of the coils 33 in this manner, the rotor 40 can be rotated in any one of the one rotational direction and the other rotational direction.

In the present embodiment, a relatively large cogging torque is generated by the magnetic force between the magnets 42 and the stator teeth 32. Therefore, when the electric power is not supplied to the electric motor 3, the rotor 40 may possibly be arrested at a predetermined rotational position.

The rotary encoder 72 is installed to the bottom portion of the rear housing 12 at a location that is adjacent to the one end portion 21 of the input axle 20. The rotary encoder 72 includes a magnet 73 and a Hall IC 75.

The magnet 73 is shaped into a ring form and is formed as a multi-pole magnet that has a plurality of N-poles and a plurality of S-poles, which are alternately arranged in a circumferential direction. The magnet 73 is fixed to the one end portion 21 of the input axle 20 such that the magnet 73 is coaxial with the input axle 20, i.e., is coaxial with the axis Ax1. Therefore, the magnet 73 can be rotated together with the input axle 20 and the rotor 40. The Hall IC 75 is installed to the circuit board 74 such that the Hall IC 75 is opposed to the magnet 73.

The circuit board 74 is fixed to the cover 13. The microcomputer 701 is installed to the circuit board 74.

The Hall IC 75 has a Hall element and a signal converter circuit. The Hall element is a magneto-electric transducer that uses a Hall effect and outputs an electric signal that is proportional to a density of a magnetic flux generated from the magnet 73. The signal converter circuit converts the output signal of the Hall element into a digital signal. The Hall IC 75 outputs a pulse signal, which is synchronized with the rotation of the rotor core 41, to the microcomputer 701. The microcomputer 701 can sense a rotational angle and a rotational direction of the rotor core 41 based on the pulse signal outputted from the Hall IC 75.

The speed reducer 50 includes a ring gear 51 and a sun gear 52. The ring gear 51 is shaped into a circular ring form and is made of metal, such as iron. The ring gear 51 is fixed to the front housing 11 such that the ring gear 51 is not rotatable relative to the front housing 11. The ring gear 51 is fixed to the housing 10 such that the ring gear 51 is located on a radially outer side of the eccentric portion 23 and is coaxial with the input axle 20, i.e., coaxial with the axis Ax1. The ring gear 51 includes a plurality of internal teeth 53, which are arranged along an inner periphery of the ring gear 51.

The sun gear 52 is shaped generally in a circular disk form and is made of metal, such as iron. The sun gear 52 has a plurality of holes 54, each of which is formed at a surface of the sun gear 52 and is radially outwardly spaced from a center of the sun gear 52 by a predetermined distance. The holes 54 are arranged at equal intervals in a circumferential direction of the sun gear 52. Furthermore, the sun gear 52 has a plurality of external teeth 55, which are configured to mesh with the internal teeth 53 of the ring gear 51. The sun gear 52 is eccentric to the input axle 20 and is rotatably supported through a bearing 19 that is installed to an outer periphery of the eccentric portion 23 of the input axle 20, so that the sun gear 52 is rotatable relative to the input axle 20. In this way, when the input axle 20 is rotated, the sun gear 52 is rotated and is revolved on a radially inner side of the ring gear 51 while the external teeth 55 of the sun gear 52 are meshed with the internal teeth 53 of the ring gear 51. Similar to the bearing 16 and the bearing 17, the bearing 19 is, for example, a ball bearing.

The output gear 60 is made of, for example, metal. The output gear 60 includes an output tubular portion 61, which is shaped generally in a cylindrical tubular form, and a circular disk portion 62, which is shaped generally in a circular disk form. The output tubular portion 61 is rotatably supported by two bearings 18, which are installed to an outer periphery of the large diameter portion 22 of the input axle 20, such that the output tubular portion 61 is rotatable relative to the input axle 20. The output tubular portion 61 is placed such that the output tubular portion 61 is coaxial with the large diameter portion 22 of the input axle 20.

The circular disk portion 62 is shaped generally in a circular disk form such that the circular disk portion 62 radially outwardly extends from an end portion of the output tubular portion 61, which is located on the sun gear 52 side, in the space 5. The circular disk portion 62 has a plurality of projections 63, each of which is shaped into a cylindrical form and projects from a surface of the circular disk portion 62 at a corresponding location that is radially outwardly spaced from a center of the circular disk portion 62 by a predetermined distance. The projections 63 are configured to be inserted into the holes 54 of the sun gear 52. In the present embodiment, the projections 63 correspond to the holes 54 and are arranged in the circumferential direction of the circular disk portion 62. A plurality of external teeth 64 is arranged along an entire circumferential extent of an outer peripheral wall of the output tubular portion 61.

With the above construction, when the sun gear 52 is rotated and is revolved on the radially inner side of the ring gear 51, an outer peripheral wall of each of the projections 63 of the circular disk portion 62 of the output gear 60 is urged by an inner peripheral wall of a corresponding one of the holes 54 in the circumferential direction. In this way, a rotational force component of the sun gear 52 is transmitted to the output gear 60. A rotational speed of the sun gear 52 is lower than a rotational speed of the input axle 20. Therefore, the rotational output of the electric motor 3 is outputted from the output gear 60 after a rotational speed of the rotation outputted from the electric motor 3 is reduced. As described above, the ring gear 51 and the sun gear 52 function as the speed reducer.

The output axle 80 includes an axle pipe portion 81, a gear portion 82, an axle hole 83 and an output axle tubular portion 85. The axle pipe portion 81, the gear portion 82 and the output axle tubular portion 85 are made of, for example, metal. The axle pipe portion 81 is shaped in, for example, a pipe form. The gear portion 82 is shaped generally in a fan shaped plate form. The gear portion 82 has a hole 820 at a center of the fan shaped part. An outer peripheral wall of one end part of the axle pipe portion 81 is fitted into the hole 820 such that the axle pipe portion 81 is not rotatable relative to the gear portion 82. Specifically, the axle pipe portion 81 and the gear portion 82 are formed separately and are integrated together such that the axle pipe portion 81 and the gear portion 82 are not rotatable relative to each other. A plurality of external teeth 84 is formed at an outer peripheral part of the gear portion 82, which is radially opposite to the axle pipe portion 81.

The axle hole 83 is formed at an inside of the axle pipe portion 81 such that the axle hole 83 extends in the axial direction of the axis Ax2. A plurality of spline grooves 831 is circumferentially arranged along the axle hole 83 such that each of the spline grooves 831 is radially outwardly recessed at the axle hole 83 and extends in the axial direction of the axis Ax2.

The output axle tubular portion 85 is formed integrally with the axle pipe portion 81 in one-piece such that the output axle tubular portion 85 is shaped generally in a cylindrical tubular form and extends from the one end part of the axle pipe portion 81 toward a side that is opposite to the other end part of the axle pipe portion 81. The output axle tubular portion 85 and the axle pipe portion 81 are coaxial with each other, i.e., are coaxial with the axis Ax2. The axle pipe portion 81, the gear portion 82 and the output axle tubular portion 85 are integrally rotatable about the axis Ax2. A space at the inside of the output axle tubular portion 85 is communicated with the axle hole 83.

The output axle 80 is installed at the space 5, which is formed between the front housing 11 and the rear housing 12, such that the external teeth 84 are meshed with the external teeth 64 of the output gear 60. Here, the output axle 80 is installed such that the axis Ax2 of the axle pipe portion 81 is generally parallel with the axis Ax1 of the input axle 20.

The output axle 80 is installed such that the axle pipe portion 81 is placed on a radially inner side of a metal bearing 87, which is shaped in a tubular form and is installed to the front housing 11. In this way, the output axle 80 is rotatably supported by the front housing 11 through the metal bearing 87.

When the electric motor 3 is rotated, the output gear 60 is rotated. Thereby, the output axle 80 is rotated about the axis Ax2 of the axle pipe portion 81. Specifically, the output axle 80 is rotated by a torque outputted from the electric motor 3.

Figure 3:
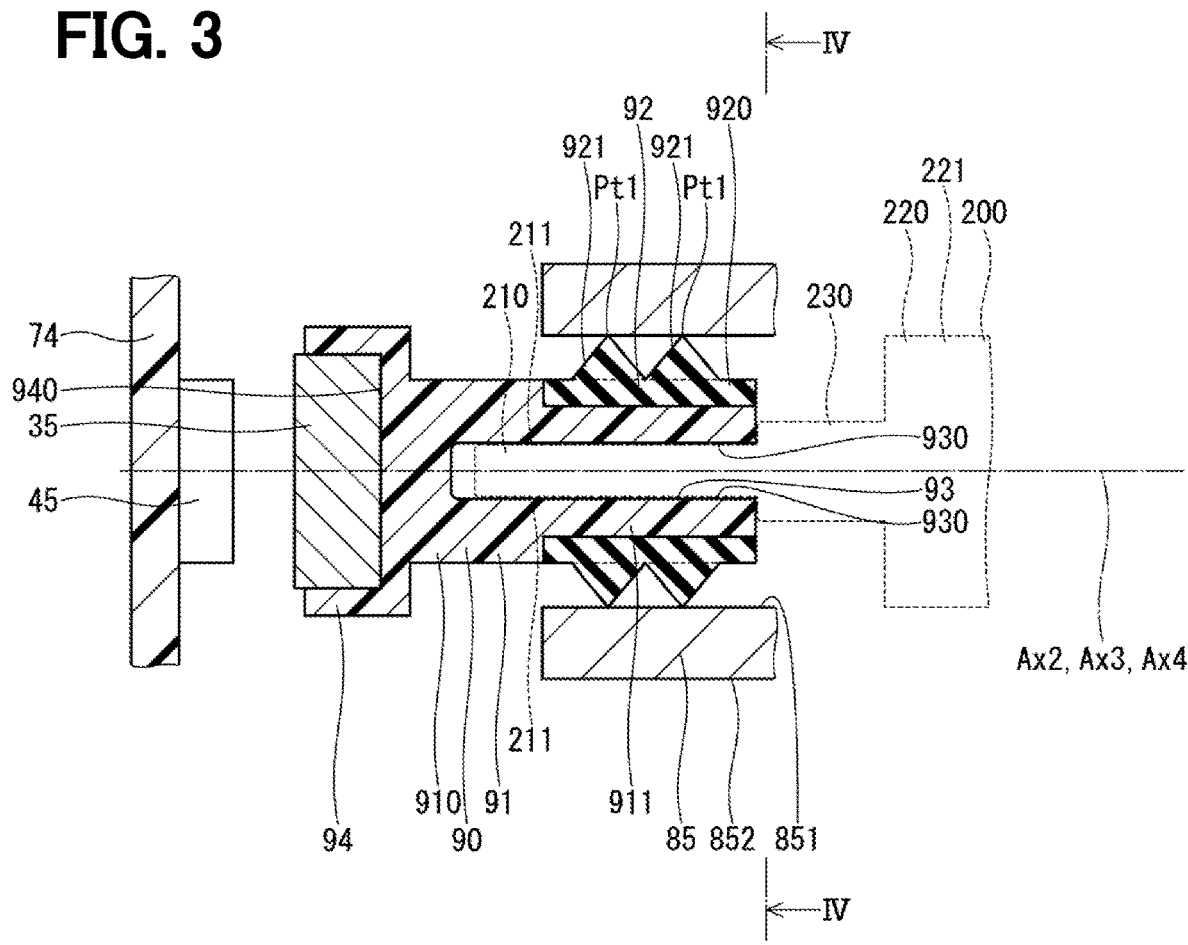
FIG. 3 is a cross-sectional view showing a magnet holder of the rotary actuator and its adjacent area according to the first embodiment.

The manual shaft 200 is made of, for example, metal and is shaped in a rod form. As shown in FIG. 3, a first fitting portion 210, an intermediate portion 230 and a second fitting portion 220 are formed at one end of the manual shaft 200. The first fitting portion 210 is shaped in a cylindrical rod form. The first fitting portion 210 has two planar surface parts 211, each of which is shaped in a planar surface form and is radially inwardly recessed from a cylindrical outer peripheral wall of the first fitting portion 210. The two planar surface parts 211 are arranged at equal intervals in a circumferential direction of the first fitting portion 210. Specifically, the two planar surface parts 211 are opposed to each other about an axis Ax3 and are parallel to each other. As described above, the first fitting portion 210 is formed to have a form of two diametrically opposed flats.

The intermediate portion 230 is shaped in a cylindrical rod form. The intermediate portion 230 is formed integrally with the first fitting portion 210 in one-piece such that the intermediate portion 230 is coaxial with the first fitting portion 210, i.e., is coaxial with the axis Ax3. The intermediate portion 230 has an outer diameter that is the same as an outer diameter of the first fitting portion 210.

The second fitting portion 220 is shaped in a cylindrical rod form. The second fitting portion 220 is formed integrally with the intermediate portion 230 in one-piece such that the second fitting portion 220 is coaxial with the intermediate portion 230, i.e., is coaxial with the axis Ax3. The second fitting portion 220 has an outer diameter that is larger than the outer diameter of the intermediate portion 230. A plurality of spline grooves 221 is circumferentially arranged along an outer peripheral wall of the second fitting portion 220 and is configured to engage with the spline grooves 831 of the axle hole 83.

As shown in FIG. 1, when the second fitting portion 220 of the manual shaft 200 of the shift-by-wire system 100 is fitted into the axle hole 83 of the output axle 80, the spline grooves 221 of the second fitting portion 220 are coupled with the spline grooves 831 of the axle hole 83 to implement a spline coupling. Thereby, the output axle 80 and the manual shaft 200 are coupled with each other. In this way, the output axle 80 outputs the torque of the electric motor 3 to the manual shaft 200 when the rotation of the input axle 20 is transmitted to the output axle 80 through the speed reducer 50 and the output gear 60.

In the present embodiment, a predetermined amount of play θ0, which is larger than a first predetermined value, is set between the manual shaft 200 and the output axle 80. The first predetermined value is a value that is larger than 0 (zero). Specifically, the manual shaft 200 is rotatable at the inside of the axle hole 83 relative to the output axle 80 within an angular range that is equal to the predetermined amount of play θ0. Therefore, the manual shaft 200 can be easily fitted into the axle hole 83.

<5> As shown in FIGS. 1 and 3, the magnet holder 90 includes a holder main body 91, a seal portion 92 and a holder hole 93. The holder main body 91 is made of, for example, resin that has heat resistance and oil resistance. Here, the hardness and the elastic modulus of the holder main body 91 are smaller than the hardness and the elastic modulus, respectively, of the output axle tubular portion 85 of the output axle 80 and also smaller than the hardness and the elastic modulus, respectively, of the manual shaft 200.

As shown in FIG. 3, the holder main body 91 has a holder large diameter portion 910, a holder small diameter portion 911 and a magnet holding portion 94. The holder large diameter portion 910 is shaped in a cylindrical rod form. The holder small diameter portion 911 is shaped in a cylindrical rod form and has an outer diameter that is smaller than an outer diameter of the holder large diameter portion 910. The holder small diameter portion 911 is formed integrally with the holder large diameter portion 910 in one-piece such that the holder small diameter portion 911 is coaxial with the holder large diameter portion 910, i.e., is coaxial with an axis Ax4 of the holder large diameter portion 910.

<9> The magnet holding portion 94 is shaped in a cylindrical rod form and has an outer diameter that is larger than the outer diameter of the holder large diameter portion 910. The magnet holding portion 94 is located on a side of the holder large diameter portion 910, which is opposite to the holder small diameter portion 911, while the magnet holding portion 94 is formed integrally with the holder large diameter portion 910 such that the magnet holding portion 94 is coaxial with the holder large diameter portion 910, i.e., coaxial with the axis Ax4. The magnet holding portion 94 has a holding recess 940 that is recess in a circular form from an end surface of the magnet holding portion 94, which is opposite to the holder large diameter portion 910. The holding recess 940 is coaxial with the holder large diameter portion 910, i.e., is coaxial with the axis Ax4.

The holder hole 93 extends in the axial direction of the axis Ax4 along the holder small diameter portion 911 and the holder large diameter portion 910 of the holder main body 91.

<5> The seal portion 92 is made of an elastic material, such as acrylic rubber or silicone rubber. The hardness and the elastic modulus of the seal portion 92 are smaller than the hardness and the elastic modulus, respectively, of the holder main body 91. Therefore, the hardness and the elastic modulus of the seal portion 92 are smaller than the hardness and the elastic modulus, respectively, of the output axle tubular portion 85 of the output axle 80 and also smaller than the hardness and the elastic modulus, respectively, of the manual shaft 200.

<1> The seal portion 92 is formed integrally with the holder main body 91 in one-piece by integrally molding the seal portion 92 and the holder main body 91. The seal portion 92 includes a seal tubular part 920 and a plurality of seal ring parts 921. The seal tubular part 920 is shaped in a cylindrical tubular form. The seal tubular part 920 is located on a radially outer side of the holder small diameter portion 911 of the holder main body 91. The seal tubular part 920 is formed integrally with the holder small diameter portion 911 in one-piece. Therefore, the seal portion 92 and the holder main body 91 are formed such that an inner peripheral wall of the seal tubular part 920 and an outer peripheral wall of the holder small diameter portion 911 make a surface-to-surface contact at a contact surface therebetween such that the seal portion 92 and the holder main body 91 are not rotatable relative to each other. Here, a plurality of grooves, a plurality of recesses and/or a plurality of projections, which extend in the axial direction, may be formed at the contact surface between the inner peripheral wall of the seal tubular part 920 and the outer peripheral wall of the holder small diameter portion 911. In this way, the relative rotation between the seal portion 92 and the holder main body 91 can be reliably limited. A depth of the respective grooves, a depth of the respective recesses and/or a height of the respective projections may be respectively set to any value as long as the relative rotation between the inner peripheral wall of the seal tubular part 920 and the outer peripheral wall of the holder small diameter portion 911 can be limited.

The seal ring parts 921 are formed integrally with the seal tubular part 920 in one-piece such that the seal ring parts 921 are respectively shaped in a ring form and radially outwardly project from the outer peripheral wall of the seal tubular part 920. In the present embodiment, the number of the seal ring parts 921 is two, and these seal ring parts 921 are arranged one after another in the axial direction of the seal tubular part 920. In a cross section taken along an imaginary plane that includes the axis Ax4, each of the seal ring parts 921 is shaped in a triangular form such that the seal ring part 921 has an apex Pt1 at a radially outer periphery of the seal ring part 921 (see FIG. 3).

An outer diameter of the seal ring part 921 is slightly larger than an inner diameter of the output axle tubular portion 85. The magnet holder 90 is formed such that the outer periphery of each of the seal ring parts 921 contacts an inner peripheral wall 851 of the output axle tubular portion 85 along a whole circumferential extent of the seal ring part 921. In this way, the seal portion 92 can seal between the magnet holder 90 (more specifically, the holder main body 91) and the inner peripheral wall 851 of the output axle tubular portion 85. The outer periphery of each seal ring part 921 is configured to slide along the inner peripheral wall 851 of the output axle tubular portion 85.

The first fitting portion 210 of the manual shaft 200 is fitted into the holder hole 93. Here, at the time of fitting the first fitting portion 210 into the holder hole 93, in a state where an outer periphery of a surface of the magnet holding portion 94, which is located on the seal portion 92 side, is urged against a retaining portion 14, which is shaped in a ring form and is formed at the rear housing 12, one end of the manual shaft 200 is inserted through the axle hole 83 such that the second fitting portion 220 is fitted into the axle hole 83, and the first fitting portion 210 is fitted into the holder hole 93. In this way, the manual shaft 200 can be easily fitted into the holder hole 93.

Figure 4:
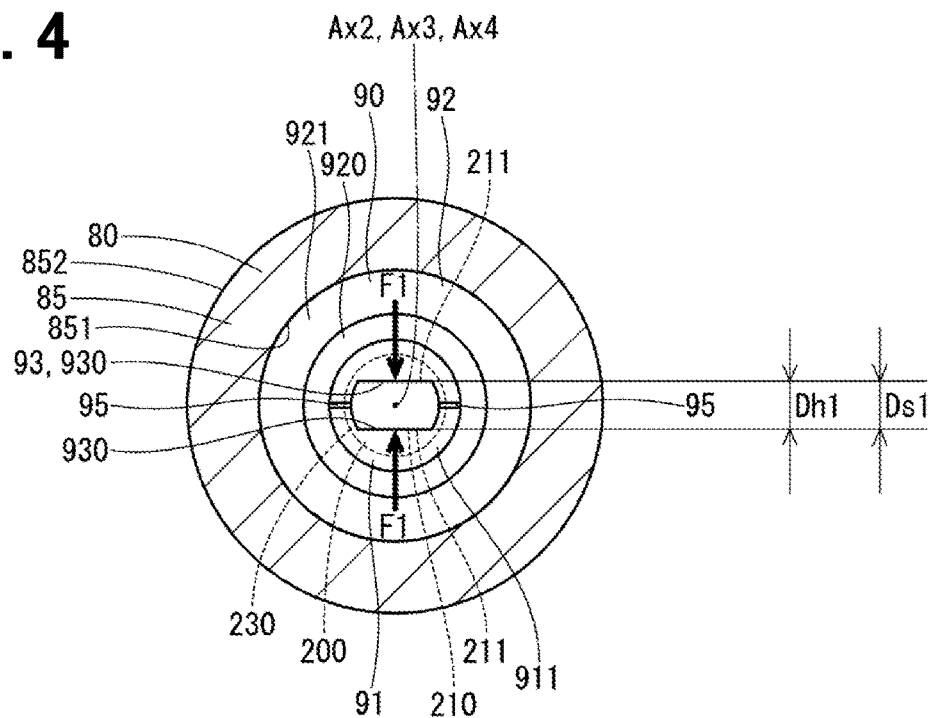
FIG. 4 is a cross-sectional view taken along line IV-IV in FIG. 3.

<3> As shown in FIG. 4, the magnet holder 90 has a plurality of slits 95, each of which is formed in a form of a cutout at a corresponding peripheral part of the holder hole 93. Each of the slits 95 is formed such that the slit 95 connects between the holder hole 93 and the outer peripheral wall of the holder small diameter portion 911 and extends from an end surface of the holder small diameter portion 911 toward the holder large diameter portion 910. In the present embodiment, the number of the slits 95 is two, and these slits 95 are arranged at equal intervals in the circumferential direction of the holder hole 93.

The holder hole 93 has a plurality of holder hole planar surface parts 930, each of which is shaped in a planar surface form. In the present embodiment, the number of the holder hole planar surface parts 930 is two, and these holder hole planar surface parts 930 are arranged at equal intervals in the circumferential direction of the holder hole 93. The two holder hole planar surface parts 930 are opposed to each other about the axis Ax4 and are parallel to each other. A straight line, which extends through the two slits 95 and the axis Ax4, is parallel to the holder hole planar surface parts 930 (see FIG. 4).

<4> When the first fitting portion 210 of the manual shaft 200 is not fitted into the holder hole 93 of the first fitting portion 210, a distance Dh1 between the two holder hole planar surface parts 930 is smaller than a distance Ds1 between the two planar surface parts 211 of the first fitting portion 210 of the manual shaft 200. Therefore, when the first fitting portion 210 of the manual shaft 200 is fitted into the holder hole 93 such that the planar surface parts 211 contact the holder hole planar surface parts 930, respectively, the holder small diameter portion 911 of the holder main body 91 is radially deformed and is expanded in a separating direction of the two holder hole planar surface parts 930, which are perpendicular to a plane of each of the holder hole planar surface parts 930. In this way, a force F1 is radially inwardly applied from each of the holder hole planar surface parts 930 to a corresponding one of the planar surface parts 211 of the manual shaft 200. Therefore, the relative rotation between the magnet holder 90 and the manual shaft 200 can be reliably limited, and the magnet holder 90 can be stably assembled to the manual shaft 200. Here, the holder hole planar surface parts 930 serve as "rotation limiting parts" that can limit the relative rotation between the magnet holder 90 and the manual shaft 200.

<2> As described above, the magnet holder 90 is configured to radially inwardly apply the forces F1 from the holder hole 93 to the manual shaft 200.

<6> In the present embodiment, the seal portion 92, which is made of the elastic material, is located on the radially outer side of the holder hole 93. Therefore, when the first fitting portion 210 of the manual shaft 200 is fitted into the holder hole 93, forces are radially inwardly applied from the seal portion 92 to the outer wall (e.g., the planar surface parts 211) of the first fitting portion 210 through the holder main body 91.

<9> The magnet 35 is shaped in a circular disk form and is made by, for example, sintering a magnetic material. The magnet 35 is configured to generate a magnetic flux. The magnet 35 is placed at, i.e., is coupled to the holding recess 940 of the magnet holding portion 94 by, for example, press fitting. Forces are radially inwardly applied from the inner peripheral wall of the holding recess 940 of the magnet holding portion 94 to an outer peripheral wall of the magnet 35. Therefore, the magnet 35 is more stably held by the magnet holding portion 94.

The angle sensor 45 includes a Hall element and a signal converter circuit. The angle sensor 45 is installed to the circuit board 74 such that the angle sensor 45 is opposed to the magnet 35. Here, the angle sensor 45 is placed along the axes (Ax3, Ax4) of the axle pipe portion 81 of the output axle 80 and the magnet holder 90. Specifically, the magnet holder 90 and the angle sensor 45 are set such that the magnet holder 90 and the angle sensor 45 are placed along the axis Ax2 of the manual shaft 200.

Terminals of the angle sensor 45, which are connected to the Hall element and the signal converter circuit, are connected to the circuit board 74. The angle sensor 45 is configured to sense the magnetic flux generated from the magnet 35 and output a signal, which corresponds to a rotational angle of the magnet holder 90, to the microcomputer 701. In this way, the microcomputer 701 can sense the rotational angle of the magnet holder 90. In the present embodiment, the magnet holder 90 is rotated integrally with the manual shaft 200, so that the microcomputer 701 can sense a rotational angle of the manual shaft 200 based on the rotational angle of the magnet holder 90.

In the present embodiment, the amount of play between the manual shaft 200 and the holder hole 93 is set to be equal to or smaller than a second predetermined value. Here, the second predetermined value is 0 (zero). Specifically, the amount of play between the manual shaft 200 and the holder hole 93 is 0 (zero). That is, the second predetermined value is smaller than the first predetermined value. Therefore, the manual shaft 200 can be easily fitted into the axle hole 83, and the sensing accuracy of the rotational angle of the manual shaft 200 by the angle sensor 45 can be increased.

Next, the operation of the rotary actuator 1 will be described.

When a driver of the vehicle requests to change the current shift range to a desirable shift range, the microcomputer 701 energizes the electric motor 3 based on the command signal outputted from the ECU 2. When the electric motor 3 is rotated through the energization of the electric motor 3, the torque of the electric motor 3 is transmitted to the output axle 80 through the speed reducer 50 and the output gear 60. When the output axle 80 is rotated by the torque transmitted to the output axle 80, the manual shaft 200, which is splined (coupled) to the axle hole 83 of the output axle 80, is rotated. Thereby, the stopper 107 of the holding mechanism is moved from one of the recesses 151-154 of the detent plate 102 to another one of the recesses 151-154.

When the amount of rotation of the electric motor 3 reaches the corresponding amount of rotation, which corresponds to the shift range requested by the driver of the vehicle, the microcomputer 701 stops the energization of the electric motor 3 based on a command signal outputted from the ECU 2. Thereby, the stopper 107 is fitted into a corresponding one of the recesses 151-154, so that the rotational position of the manual shaft 200 is held at the predetermined position.

When the manual shaft 200 is rotated by the electric motor 3, the magnet holder 90 is rotated integrally with the manual shaft 200. At this time, the ECU 2 and the microcomputer 701 can sense the rotational angle of the manual shaft 200 based on the signal outputted from the angle sensor 45.

In the present embodiment, the seal portion 92 seals between the holder main body 91 and the output axle tubular portion 85, so that the automatic transmission fluid (ATF) conducted from the shift range change device 110 side and/or the water and dust located between the rotary actuator 1 and the shift range change device 110 is/are limited from intruding into the control device 700 side through the axle hole 83 and the inside of the output axle tubular portion 85. Thereby, the deterioration of the sensing accuracy of the rotational angle of the manual shaft 200 sensed with the angle sensor 45 can be limited, and an operational failure of the electric motor 3 can be limited.

In the present embodiment, a seal member 6, which is shaped in a ring form and is made of rubber, is interposed between an inner wall of the front housing 11 and an end part of the axle pipe portion 81, which is opposite to the output axle tubular portion 85 (see FIG. 1). In this way, a gap between the axle pipe portion 81 and the inner wall of the front housing 11 can be sealed.

In the present embodiment, a seal member 7, which is shaped in a ring form and is made of rubber, is interposed between an opening end part of the front housing 11 and an opening end part of the rear housing 12 (see FIG. 1). Thereby, a gap between the front housing 11 and the rear housing 12 can be sealed.

In the present embodiment, a vibration transmission limiting portion 9, which is shaped in a ring form and is made of rubber, is interposed between an outer periphery of the rear housing 12 and an outer periphery of the cover 13 (see FIG. 1). Thereby, the gap between the rear housing 12 and the cover 13 can be sealed. Furthermore, it is possible to limit transmission of vibrations, which are generated through the rotation of the rotor 40, from the rear housing 12, which rotatably supports the rotor 40, to the control device 700 through the cover 13, which supports the control device 700.

As described above, <1> according to the present embodiment, the output axle 80 includes: the axle pipe portion 81, at which the axle hole 83 is formed; and the output axle tubular portion 85, which is located on the side of the axle pipe portion 81 that is opposite to the shift range change device 110. The magnet holder 90 includes: the holder main body 91, at which the holder hole 93 is formed; and the seal portion 92, which is formed integrally with the holder main body 91 in one-piece, while the seal portion 92 is configured to contact the inner peripheral wall 851 of the output axle tubular portion 85 and seal between the magnet holder 90 and the output axle tubular portion 85.

In the present embodiment, the seal portion 92, which is configured to seal between the magnet holder 90 and the output axle tubular portion 85, is formed integrally with the holder main body 91 in one piece. Therefore, the number of the components and the number of the assembling steps can be reduced.

Furthermore, <2> in the present embodiment, the magnet holder 90 is configured to radially inwardly apply the forces F1 from the holder hole 93 to the manual shaft 200. Therefore, the play of the manual shaft 200 can be eliminated simply by fitting the manual shaft 200 into the holder hole 93, and thereby it is possible to eliminate, for example, a spring that urges the holder hole 93 against the manual shaft 200.

Furthermore, <3> in the present embodiment, the magnet holder 90 has the slits 95, each of which is formed in the form of the cutout at the corresponding peripheral part of the holder hole 93. Therefore, at the time of fitting the manual shaft 200 into the holder hole 93, the magnet holder 90 can be easily deformed, and the forces F1, which are radially inwardly applied from the holder hole 93 against the manual shaft 200, can be increased. Thus, the relative rotation between the magnet holder 90 and the manual shaft 200 can be reliably limited, and the magnet holder 90 can be stably assembled to the manual shaft 200.

Furthermore, <4> in the present embodiment, the magnet holder 90 includes the holder hole planar surface parts 930 that are configured to limit the relative rotation between the magnet holder 90 and the manual shaft 200. Since the holder hole planar surface parts 930 are respectively shaped in the planar surface form, the holder hole planar surface parts 930 can be accurately and easily formed.

Furthermore, <5> in the present embodiment, the hardness of the material of the holder main body 91 is different from the hardness of the material of the seal portion 92. In the present embodiment, the holder main body 91, which has the holder hole 93, is made of the material that has the high hardness, and the seal portion 92, which seals between the holder main body 91 and the output axle tubular portion 85, is made of the material that has the hardness lower than the hardness of the material of the holder main body 91. Thereby, the sensing accuracy of the rotational angle of the manual shaft 200 sensed with the angle sensor 45 can be increased, and the sealing performance of the seal portion 92 can be increased.

Furthermore, <6> in the present embodiment, the seal portion 92 is located on the radially outer side of the holder hole 93. Therefore, when the first fitting portion 210 of the manual shaft 200 is fitted into the holder hole 93, the forces are radially inwardly applied from the seal portion 92 to the outer wall (e.g., the planar surface parts 211) of the first fitting portion 210 through the holder main body 91. Thus, the relative rotation between the magnet holder 90 and the manual shaft 200 can be further reliably limited, and the magnet holder 90 can be further stably assembled to the manual shaft 200. Furthermore, by increasing the hardness of the holder main body 91, which contacts the manual shaft 200 made of the metal, wearing of the magnet holder 90 can be limited.

Furthermore, <9> in the present embodiment, the holder main body 91 includes the magnet holding portion 94 that holds the magnet 35. The magnet 35 is placed at, i.e., is coupled to the magnet holding portion 94 by the press fitting. Thereby, the shape of the magnet 35 can be simplified to reduce the costs.

Second Embodiment

Figure 5:
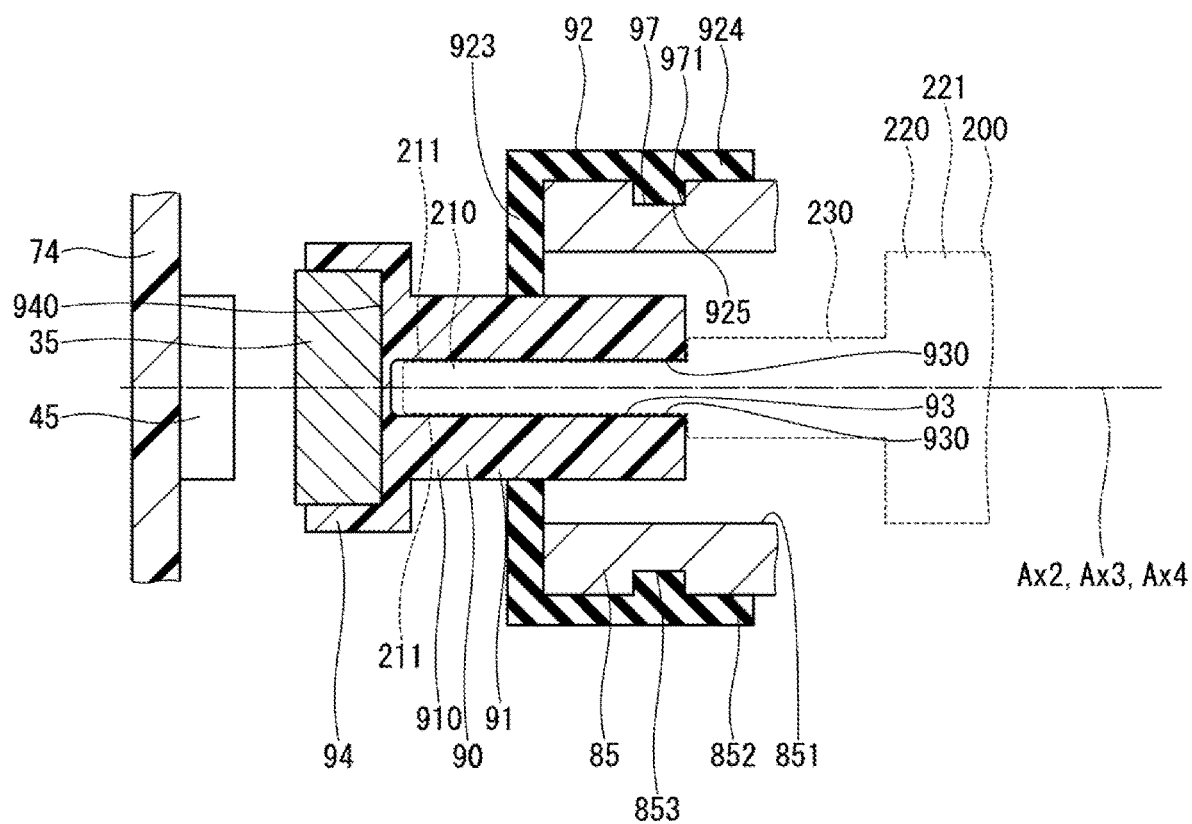
FIG. 5 is a cross-sectional view showing a magnet holder of a rotary actuator and its adjacent area according to a second embodiment.

FIG. 5 shows a portion of a rotary actuator according to a second embodiment. The second embodiment differs from the first embodiment with respect to the structures of the magnet holder 90 and the output axle tubular portion 85.

In the present embodiment, the holder main body 91 does not have the holder small diameter portion 911. Specifically, the holder main body 91 includes the holder large diameter portion 910 and the magnet holding portion 94. Furthermore, the holder hole 93 is formed to extend from an end surface of the holder large diameter portion 910, which is opposite to the magnet holding portion 94, to the magnet holding portion 94 in the axial direction of the axis Ax4.

The seal portion 92 is integrally molded with the holder main body 91 and is thereby formed integrally with the holder main body 91 in one-piece. The seal portion 92 includes a seal plate part 923, a seal tubular part 924 and a seal projecting part 925. The seal plate part 923 is shaped in a ring plate form, and an inner periphery of the seal plate part 923 is formed integrally with an outer peripheral wall of the holder large diameter portion 910 in one-piece. Therefore, the seal portion 92 and the holder main body 91 are formed such that the inner periphery of the seal plate part 923 and the outer peripheral wall of the holder large diameter portion 910 make a surface-to-surface contact (more specifically, a surface-to-surface joint) at a contact surface therebetween such that the seal portion 92 and the holder main body 91 are not rotatable relative to each other. A surface of the seal plate part 923, which is located on the output axle tubular portion 85 side, is configured to contact an end surface of the output axle tubular portion 85. Furthermore, a plurality of grooves, a plurality of recesses and/or a plurality of projections, which extend in the axial direction, may be formed at the contact surface between the inner periphery of the seal plate part 923 and the outer peripheral wall of the holder large diameter portion 910. In this way, the relative rotation between the inner periphery of the seal plate part 923 and the outer peripheral wall of the holder large diameter portion 910 can be reliably limited. A depth of the respective grooves, a depth of the respective recesses and/or a height of the respective projections may be respectively set to any value as long as the relative rotation between the inner periphery of the seal plate part 923 and the outer peripheral wall of the holder large diameter portion 910 can be limited.

The seal tubular part 924 is formed integrally with the seal plate part 923 in one-piece such that the seal tubular part 924 is shaped in a tubular form and extends from the outer periphery of the seal plate part 923 toward the output axle tubular portion 85 side. Here, the inner peripheral wall of the seal tubular part 924 is configured to contact an outer peripheral wall 852 of the output axle tubular portion 85.

The seal projecting part 925 is formed integrally with the seal tubular part 924 in one-piece such that the seal projecting part 925 radially inwardly projects from the inner peripheral wall of the seal tubular part 924. The seal projecting part 925 is shaped in a ring form.

The output axle tubular portion 85 has an output axle groove 853. The output axle groove 853 is shaped in an annular form and is radially inwardly recessed from the outer peripheral wall 852 of the output axle tubular portion 85. The output axle groove 853 is configured to receive the seal projecting part 925.

<7> In the present embodiment, the seal portion 92 is integrally molded with the output axle tubular portion 85 and is thereby joined to the output axle tubular portion 85 such that the seal projecting part 925 is received in the output axle groove 853. Therefore, the seal portion 92 and the output axle tubular portion 85 are formed such that the seal projecting part 925 and the output axle groove 853 make a surface-to-surface contact (more specifically, a surface-to-surface joint) at a contact surface therebetween such that the seal portion 92 and the output axle tubular portion 85 are not rotatable relative to each other. Here, the second predetermined value is smaller than the first predetermined value. Therefore, when the manual shaft 200 and the holder main body 91 are rotated relative to the output axle tubular portion 85 within the range of the first predetermined value, the inner periphery of the seal plate part 923 is rotated relative to the seal projecting part 925. Thereby, the seal portion 92 is deformed such that the seal portion 92 is twisted in the circumferential direction. Here, a plurality of grooves, a plurality of recesses and/or a plurality of projections, which extend in the axial direction, may be formed at the contact surface between the seal projecting part 925 and the output axle groove 853. In this way, the relative rotation between the seal projecting part 925 and the output axle groove 853 can be reliably limited. A depth of the respective grooves, a depth of the respective recesses and/or a height of the respective projections may be respectively set to any value as long as the relative rotation between the seal projecting part 925 and the output axle groove 853 can be limited.

<8> In the present embodiment, as shown in FIG. 5, a contact portion 97, at which the seal projecting part 925 and the output axle groove 853 contact with each other, is shaped in a form of a labyrinth having a bent portion 971 that is bent at least once. Here, the contact portion 97 serves as a contact portion, at which the seal portion 92 and the output axle tubular portion 85 contact with each other. In a cross section that is taken along an imaginary plane, which includes the axis Ax4, a contact surface between the seal projecting part 925 and the output axle groove 853 is formed to bend multiple times at a right angle (see FIG. 5).

As described above, <1> in the present embodiment, the magnet holder 90 includes: the holder main body 91, at which the holder hole 93 is formed; and the seal portion 92, which is formed integrally with the holder main body 91 in one-piece, while the seal portion 92 is configured to contact the outer peripheral wall 852 of the output axle tubular portion 85 and seal between the magnet holder 90 and the output axle tubular portion 85. Therefore, like in the first embodiment, the number of the components and the number of the assembling steps can be reduced.

Furthermore, <7> in the present embodiment, the seal portion 92 is integrally molded with the output axle tubular portion 85 and is thereby joined to the output axle tubular portion 85. Therefore, the sealing performance for sealing between the seal portion 92 and the output axle tubular portion 85 can be increased.

Furthermore, <8> in the present embodiment, the contact portion 97, at which the seal portion 92 and the output axle tubular portion 85 contact with each other, is shaped in the form of the labyrinth having the bent portion 971 that is bent at least once. Therefore, the sealing performance for sealing between the seal portion 92 and the output axle tubular portion 85 can be increased.

Third Embodiment

Figure 6:
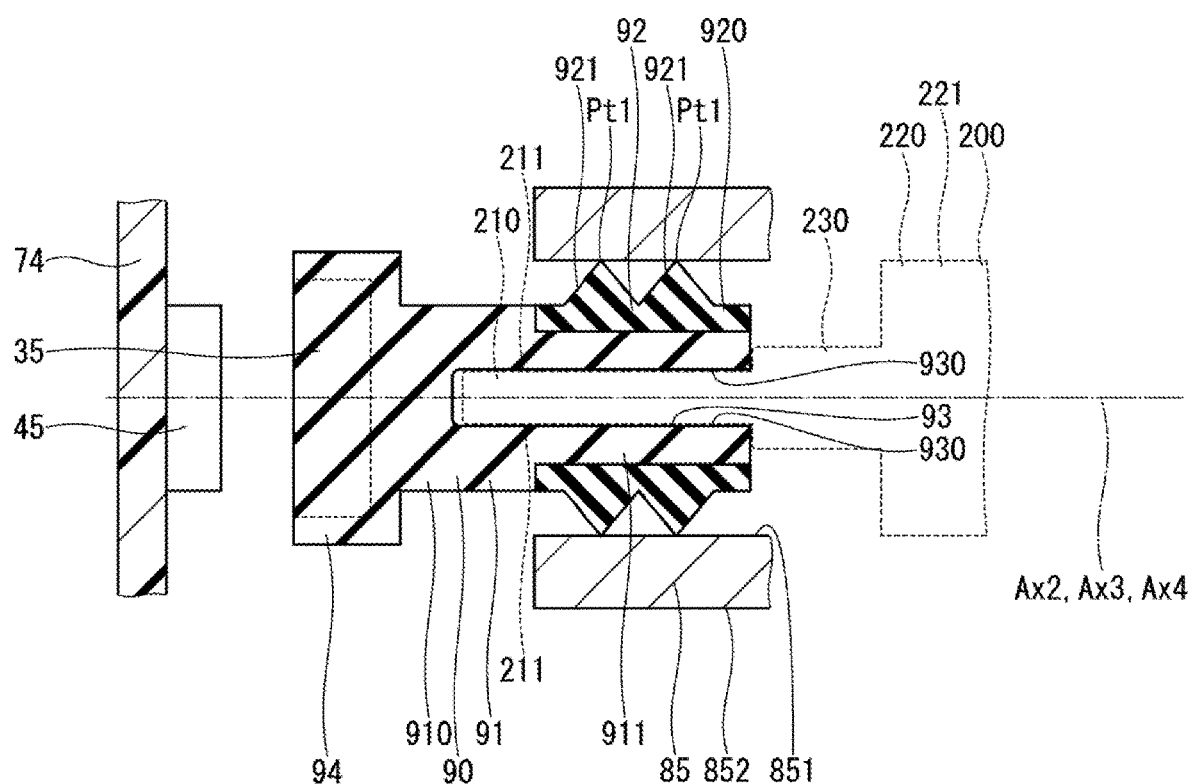
FIG. 6 is a cross-sectional view showing a magnet holder of a rotary actuator and its adjacent area according to a third embodiment.

FIG. 6 shows a portion of a rotary actuator according to a third embodiment. The third embodiment differs from the first embodiment with respect to the structures of the magnet 35 and the magnet holder 90.

<10> in the present embodiment, the magnet 35 is made of, for example, rubber into which a magnetic material is kneaded (mixed). The magnet 35 is magnetized to generate the magnetic flux.

The holder main body 91 is formed integrally with the magnet 35 in one-piece from the material that is the same as the material of the magnet 35. Therefore, the number of the components and the number of the assembling steps can be further reduced.

The hardness and the elastic modulus of the magnet 35 and the holder main body 91 are smaller than the hardness and the elastic modulus, respectively, of the output axle tubular portion 85 of the output axle 80 and also smaller than the hardness and the elastic modulus, respectively, of the manual shaft 200 and are larger than the hardness and the elastic modulus, respectively, of the seal portion 92.

Other Embodiments

In another embodiment, the magnet holder 90 may not have the slits 95.

Furthermore, in the above embodiment, the magnet holder 90 has the holder hole planar surface parts 930 that are formed as the rotation limiting parts, which are configured to limit the relative rotation between the magnet holder 90 and the manual shaft 200. Alternatively, in another embodiment, a plurality of spline grooves may be formed at the first fitting portion 210 of the manual shaft 200, and a plurality of spline grooves, which are engaged with the spline grooves of the first fitting portion 210, may be formed at the holder hole 93, so that the spline grooves of the first fitting portion 210 and the spline grooves of the holder hole 93 serve as rotation limiting parts.

Furthermore, in another embodiment, the hardness of the material of the holder main body 91 and the hardness of the material of the seal portion 92 may be equal to each other.

Furthermore, in the second embodiment described above, there is described the example, in which the seal portion 92 is integrally molded with the output axle tubular portion 85 and is thereby joined to the output axle tubular portion 85 such that the seal projecting part 925 is received in the output axle groove 853. Alternatively, in another embodiment, the seal portion 92 may not be integrally molded with the output axle tubular portion 85 to join with the output axle tubular portion 85. Specifically, the seal portion 92 and the output axle tubular portion 85 may be formed such that the seal portion 92 and the output axle tubular portion 85 can make relative rotation therebetween.

Furthermore, in the first and third embodiments, there is described the example, in which the magnet 35 is placed at, i.e., is coupled to the magnet holding portion 94 by the press fitting. Alternatively, in another embodiment, the magnet 35 may be placed at the magnet holding portion 94 by insert molding or bonding.

Furthermore, the above embodiments may be combined one another as long as there is no interfering factor that interferes such a combination. For example, the second embodiment and the third embodiment may be combined such that the seal portion 92 and the output axle tubular portion 85 of the third embodiment are formed like the seal portion 92 and the output axle tubular portion 85 of the second embodiment.

In another embodiment, the electric motor 3 is not necessarily the three-phase brushless motor having the magnets 42. For example, the electric motor 3 may be another type of electric motor, such as a switched reluctance motor (i.e., SR motor).

In another embodiment, the number of the recesses of the detent plate may be any number. Specifically, the number of the shift ranges of the automatic transmission, to which the present disclosure is applicable, is not necessarily limited to four.

Besides the automatic transmission of, for example, a continuously variable transmission (CVT) or an automatic transmission of a hybrid vehicle (HV), which changes the shift position among the four positions, i.e., the P-range, the R-range, the N-range and the D-range in a manner similar to the above embodiment, the shift-by-wire system of the present disclosure may be used for, for example, the range changing of the parking mechanism of an electric vehicle (EV) or the HV, which changes between two positions, i.e., the P-range and notP-range (non P-range, i.e., non-parking range).

In another embodiment of the present disclosure, another device, which is other than the shift range change device or the parking change device of the shift-by-wire system of the vehicle, may be used as the subject device (i.e., the drive subject) or the installation subject of the rotary actuator.

As described above, the present disclosure is not necessarily limited to the above embodiments and may be modified in various ways within the scope of the present disclosure.

What is claimed is:

1. A rotary actuator configured to rotate a shaft of a subject device, comprising:
    a housing;
    an electric motor that is received in the housing;
    an output axle that has an axle hole, through which the shaft is inserted while the shaft is fitted to the axle hole, wherein the output axle is configured to be rotated by a torque outputted from the electric motor and output the torque to the shaft;
    a magnet holder that has a holder hole, into which the shaft is fitted, wherein the magnet holder is configured to be rotated integrally with the shaft;
    a magnet that is placed at the magnet holder and is configured to generate a magnetic flux; and
    an angle sensor that is configured to sense the magnetic flux generated from the magnet and output a signal, which corresponds to a rotational angle of the magnet holder, wherein:
    the output axle includes:
        an axle pipe portion, at which the axle hole is formed; and
        an output axle tubular portion, which is located on a side of the axle pipe portion that is opposite to the subject device; and
    the magnet holder includes:
        a holder main body, at which the holder hole is formed; and
        a seal portion, which is formed integrally with the holder main body in one-piece, while the seal portion is configured to contact one of an inner peripheral wall and an outer peripheral wall of the output axle tubular portion and seal between the magnet holder and the output axle tubular portion.

2. The rotary actuator according to claim 1, wherein the magnet holder is configured to radially inwardly apply a force from the holder hole to the shaft.

3. The rotary actuator according to claim 1, wherein the magnet holder has a slit that is formed in a form of a cutout at a corresponding peripheral part of the holder hole.

4. The rotary actuator according to claim 1, wherein the magnet holder includes a rotation limiting part that is configured to limit relative rotation between the magnet holder and the shaft.

5. The rotary actuator according to claim 1, wherein a hardness of a material of the holder main body is different from a hardness of a material of the seal portion.

6. The rotary actuator according to claim 1, wherein the seal portion is located on a radially outer side of the holder hole.

7. The rotary actuator according to claim 1, wherein the seal portion is integrally molded with the output axle tubular portion and is thereby joined to the output axle tubular portion.

8. The rotary actuator according to claim 1, wherein a contact portion, at which the seal portion and the output axle tubular portion contact with each other, is shaped in a form of a labyrinth having a bent portion that is bent at least once.

9. The rotary actuator according to claim 1, wherein:
    the holder main body includes a magnet holding portion that holds the magnet; and
    the magnet is placed at the magnet holding portion by one of insert molding, press fitting and bonding.

10. The rotary actuator according to claim 1, wherein the holder main body is formed integrally with the magnet in one-piece from a material that is the same as a material of the magnet.

* * * * *